(12) United States Patent
Wu et al.

(10) Patent No.: US 11,835,773 B2
(45) Date of Patent: Dec. 5, 2023

(54) OPTIC FIBER CONNECTOR

(71) Applicant: ACON OPTICS COMMUNICATIONS INC., New Taipei (TW)

(72) Inventors: Jia Rong Wu, New Taipei (TW); Tsung Yao Hsu, New Taipei (TW)

(73) Assignee: ACON OPTICS COMMUNICATIONS INC., New Taipei (TW)

( * ) Notice: Subject to any disclaimer, the term of this patent is extended or adjusted under 35 U.S.C. 154(b) by 17 days.

(21) Appl. No.: 17/707,981

(22) Filed: Mar. 30, 2022

(65) Prior Publication Data

US 2022/0326453 A1 Oct. 13, 2022

(30) Foreign Application Priority Data

Apr. 12, 2021 (TW) .................................. 110203921

(51) Int. Cl.
*G02B 6/38* (2006.01)

(52) U.S. Cl.
CPC ......... *G02B 6/3869* (2013.01); *G02B 6/3831* (2013.01)

(58) Field of Classification Search
CPC ..... G02B 6/3833; G02B 6/387; G02B 6/3849
See application file for complete search history.

(56) References Cited

U.S. PATENT DOCUMENTS

| 8,439,577 | B2 | 5/2013 | Jenkins | |
|---|---|---|---|---|
| 10,007,068 | B2 | 6/2018 | Hill et al. | |
| 2005/0244108 | A1* | 11/2005 | Billman | G02B 6/3846 385/60 |
| 2017/0343745 | A1* | 11/2017 | Rosson | G02B 6/3874 |

FOREIGN PATENT DOCUMENTS

WO 2021231752 11/2021

OTHER PUBLICATIONS

"Search Report of Europe Counterpart Application", dated Sep. 12, 2022, pp. 1-9.

* cited by examiner

*Primary Examiner* — Eric Wong
(74) *Attorney, Agent, or Firm* — JCIPRNET

(57) ABSTRACT

The disclosure provides an optic fiber connector, including a ferrule, a holder, a connector body having a plurality of first locking slots, a spring sleeved onto the holder, and a retainer having a plurality of locking hooks. The ferrule is assembled to the holder. The spring, the holder, and the ferrule are received in a space formed between the retainer and the connector body by locking the locking hooks with the locking slots respectively, wherein the spring is compressed by locking such that the retainer, the holder, the spring, and the connector body are abutted with each other.

18 Claims, 5 Drawing Sheets

OPTIC FIBER CONNECTOR

CROSS-REFERENCE TO RELATED APPLICATION

This application claims the priority benefit of Taiwan Application Serial No. 110203921, FILED ON Apr. 12, 2021. The entirety of the above-mentioned patent application is hereby incorporated by reference herein and made a part of this specification.

BACKGROUND

Technical Field

The disclosure relates to an optic fiber connector.

Description of Related Art

Since optic fiber has the advantages of low loss and high frequency bandwidth, it has been used widely as a signal transmission medium in recent years. With the technological expansion of optical communication networks, it makes the wide area networks such as the Internet and internal networks quite common, which also increases the communication traffic.

To meet the needs of the home fiber optic network, related components (including fiber optic connectors) must be able to be wired in the structure of a building, for example, components capable of passing through the wiring tubes in the structure. However, the existing products evidently cannot meet the above requirements due to their larger size.

Accordingly, it has become a subject for those skilled in the art to improve the structure of the existing optic fiber connector to meet the above requirements.

SUMMARY

The present disclosure provides an optic fiber connector whose simple structure has a volume reduction effect that facilitates wiring in a tube with a small space to save space.

The optic fiber connector of the present disclosure includes a ferrule, a holder, a connector body, a spring, and a retainer. The ferrule is assembled to the holder. The connector body has a plurality of first locking slots. The spring is sleeved onto the holder. The retainer has a plurality of first locking hooks which are respectively fastened with the first locking slots to assemble the spring, the holder, and the ferrule into a space formed between the retainer and the connector body. The spring is compressed to make the retainer, the holder, the spring, and the connector body abut against each other.

In an embodiment of the present disclosure, the ferrule described above is riveted into the barrel of the holder, and the barrel abuts against and within the retainer.

In an embodiment of the present disclosure, a shape of an outer profile of the barrel and an inner wall of the retainer is a polygon that is consistent with and corresponds to each other.

In an embodiment of the present disclosure, the aforementioned polygon is a hexagon.

In an embodiment of the present disclosure, the connector body described above includes a base and a crimp ring, the crimp ring is sleeved onto an outer surface of one end of the base, and the other end of the base has the first locking slots described above.

In an embodiment of the present disclosure, the holder described above includes a barrel and a column, the ferrule is disposed on the barrel, the column extends from the barrel to the base in an direction away from the ferrule, and the spring is sleeved onto the column and abuts between an inner step of the base and the barrel.

In an embodiment of the present disclosure, the outer surface described above is a rough surface.

In an embodiment of the present disclosure, the optic fiber connector described above further includes a protective cover, where an end of the ferrule away from the holder passes through the retainer, and the protective cover is detachably sleeved onto where the ferrule protrudes from the retainer.

In an embodiment of the present disclosure, an outer surface of the protective cover described above has a rough surface.

In an embodiment of the present disclosure, the protective cover described above has a tapered profile facing away from the ferrule.

In an embodiment of the present disclosure, the optic fiber connector described above further includes a fixing sleeve, which is fastened to the outside of the retainer away from a base.

In an embodiment of the present disclosure, the fixing sleeve described above has a plurality of second locking hooks, which are fastened with a plurality of second locking slots of the retainer.

In an embodiment of the present disclosure, the outside of the retainer described above has a positioning surface, the fixing sleeve also has a positioning inner wall, and the positioning surface correspondingly abuts against the positioning inner wall.

In an embodiment of the present disclosure, the optic fiber connector described above further includes a tail sleeve, which is sleeved onto the base of the connector body and covers a crimp ring of the connector body, where the base has the aforementioned first locking slots which is exposed outside the tail sleeve, and the tail sleeve abuts against the fixed sleeve described above.

In an embodiment of the present disclosure, the optic fiber connector described above further includes a coupling cap, which is sleeved onto the tail sleeve to cover the fixing sleeve described above.

In an embodiment of the present disclosure, the fixing sleeve described above has a guiding protrusion, an inner wall of the coupling cap has a guiding slot, and the guiding protrusion is slidably connected to the guiding slot.

In an embodiment of the present disclosure, the optic fiber connector described above is adapted to pass through a tube, wherein the inner diameter of the tube is 5.5 mm, the maximum cross-sectional outer diameter of the ferrule, the holder, the connector body, the spring, and the retainer after being assembled is less than 5.5 mm.

In an embodiment of the present disclosure, the optic fiber connector described above is an SC connector (a standard connector).

Based on the above, the optic fiber connector of the present disclosure includes components including a ferrule, a holder, a connector body, a spring, and a retainer which enable it to pass through the tube for wiring, before sleeving other components on the aforementioned components that have passed through the tube to complete the assembly of the optic fiber connector. According to the requirements of the inner diameter of the tube, the assembled components are reduced correspondingly in volume, thereby simplifying the processing process. As the volume is reduced, the spring, the retainer, and the ferrule are assembled into the space formed between the retainer and the connector body by buckling the retainer and the connector body, where the spring is compressed by the aforementioned buckling that makes the retainer, the holder, the spring, and the connector body press tightly against each other, so that the components maintain its structural connection properly.

DESCRIPTION OF THE EMBODIMENTS

Figure 1:
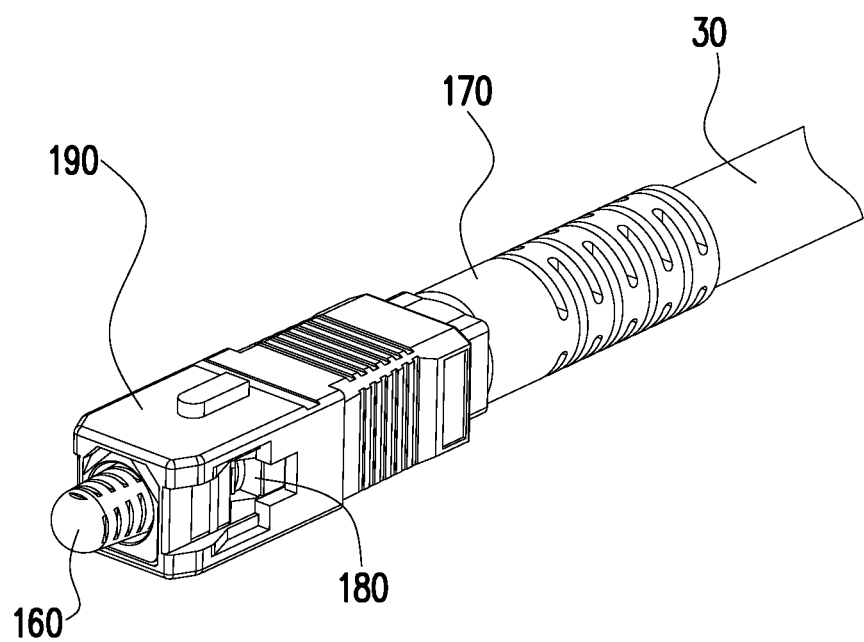
FIG. 1 is a schematic diagram of an optic fiber connector according to an embodiment of the disclosure.
Figure 2:
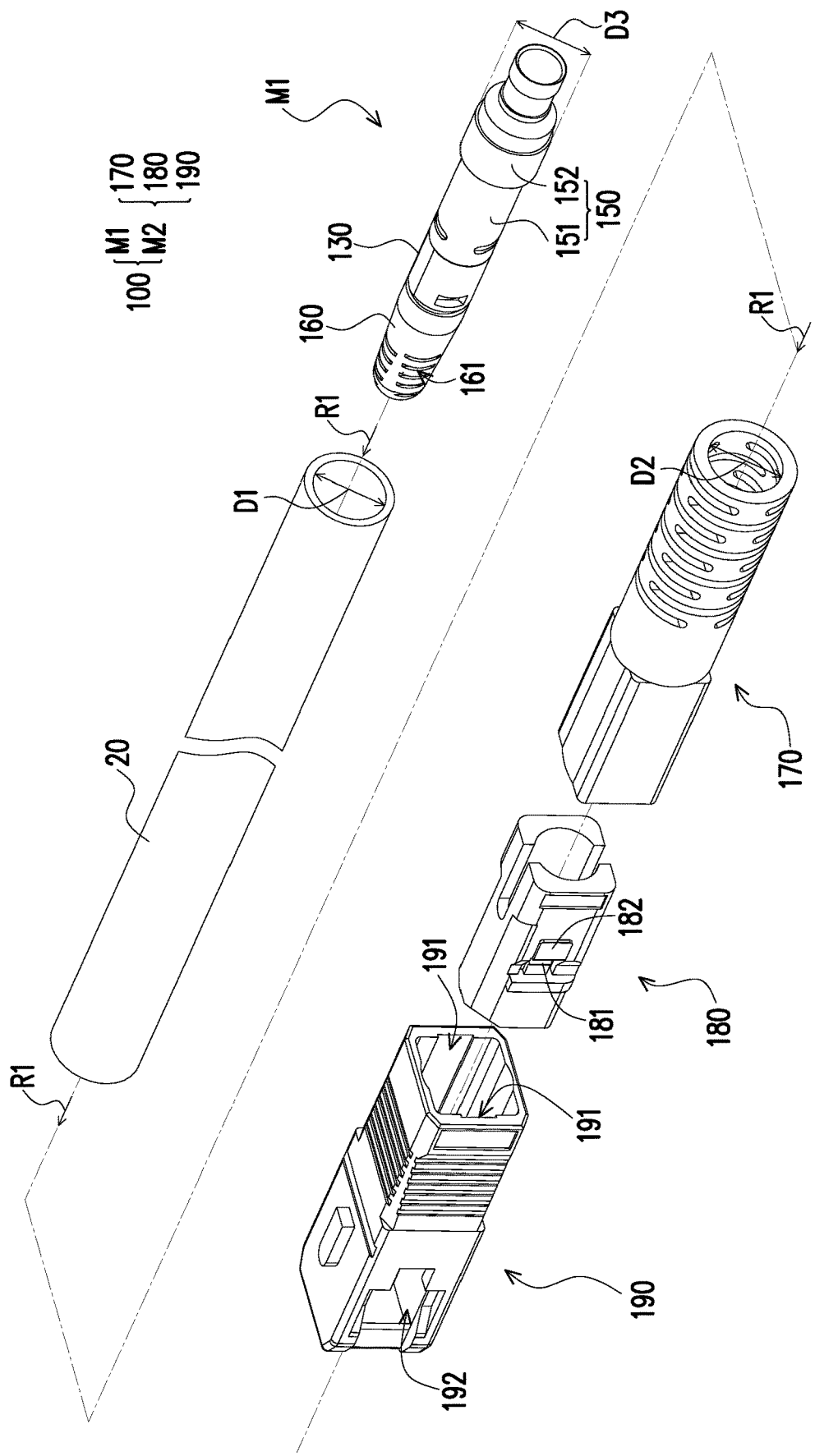
FIG. 2 is an assembly schematic diagram of the optic fiber connector of FIG. 1.

FIG. 1 is a schematic diagram of an optic fiber connector according to an embodiment of the disclosure. FIG. 2 is an assembly schematic diagram of the optic fiber connector of FIG. 1. In FIG. 1 and FIG. 2, in this embodiment, an optic fiber connector 100 is, for example, an SC connector used to meet the requirements for wiring a building, so it needs to pass through a wiring tube 20 for installation in the structure of a building. With this premise, the optic fiber connector 100 of this embodiment needs to further adjust its structural configuration to be installed smoothly. Accordingly, the optic fiber connector 100 of this embodiment includes a first assembly M1 and a second assembly M2. As shown in FIG. 2, the second assembly M2 includes a tail sleeve 170, a fixing sleeve 180, and a coupling cap 190, and these three components are limited by the standard size of the optic fiber connector 100 and cannot pass through the tube 20 smoothly. Therefore, in this embodiment, it is necessary to complete the component assembly work of the first assembly M1 first, and passing it through the tube 20 along an assembly direction R1. After the first assembly M1 coming out from the other end of the tube 20, the second assembly M2 is then installed to the first assembly M1. In this way, the first assembly M1 of this embodiment may reduce its cross-sectional outer diameter effectively. In other words, taking the tube 20 having an inner diameter D1 of 5.5 mm as an example, after the first assembly M1 is assembled, its maximum cross-sectional outer diameter D3 is less than 5.5 mm, so that the first assembly M1 can smoothly enters the tube 20. In this embodiment, the assembly direction R1 as shown is also substantially on the common central axis (shown by the center line of the drawing) of the first assembly M1 and the second assembly M2.

Figure 3:
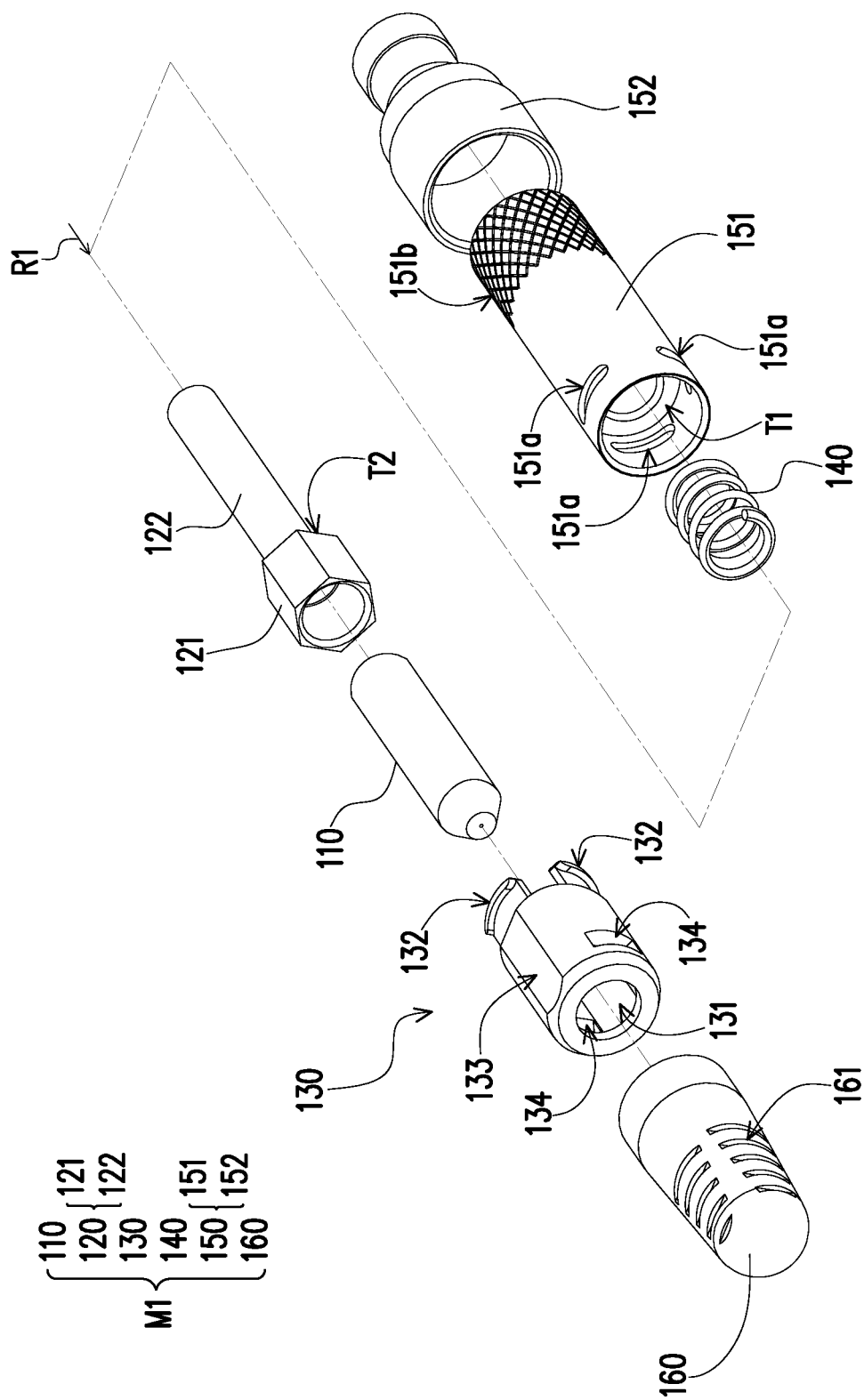
FIG. 3 is an exploded view of the first assembly of FIG. 2.
Figure 4:
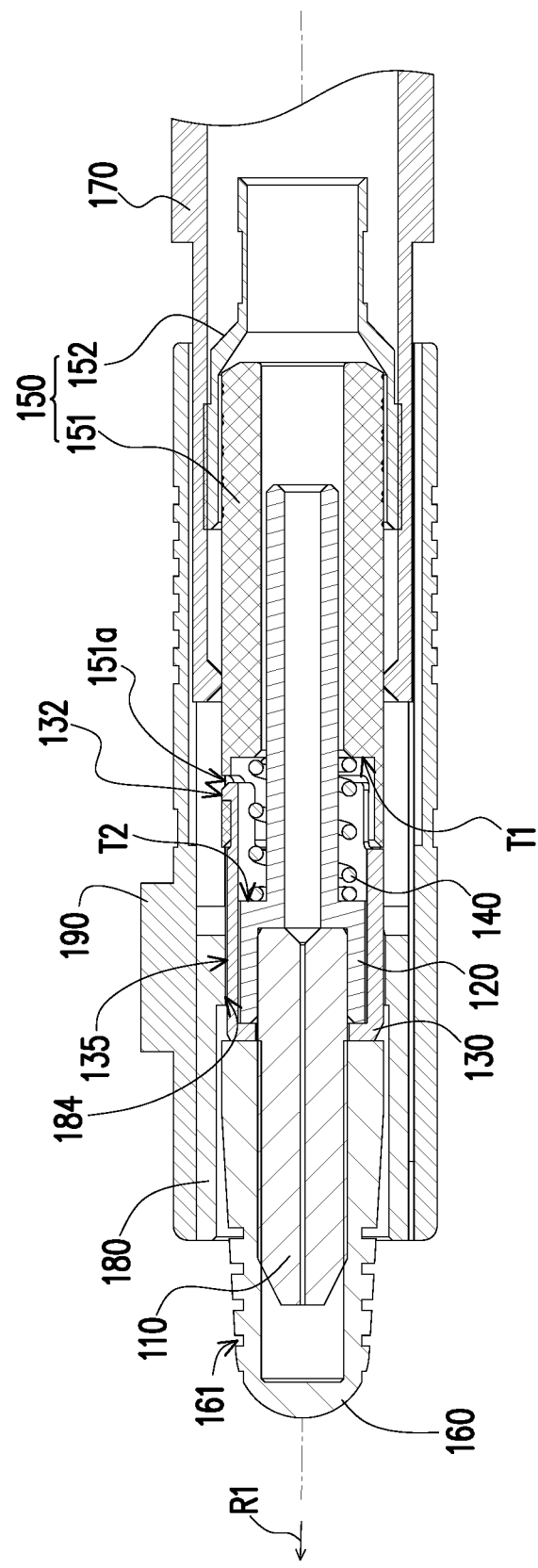
FIG. 4 is a partial cross-sectional view of the optic fiber connector of FIG. 1.

FIG. 3 is an exploded view of the first assembly of FIG. 2. FIG. 4 is a partial cross-sectional view of the optic fiber connector of FIG. 1. In FIG. 3 and FIG. 4, the first assembly M1 of this embodiment includes a ferrule 110, a holder 120, a connector body 150, a spring 140, a retainer 130, and an (optic fiber) cable 30 that is also shown in FIG. 1. Here, in order to facilitate the drawing of the first assembly M1, the cable 30 is omitted in multiple drawings. The ferrule 110 is assembled to the holder 120, and the ferrule 110 is adapted for an optic fiber (not shown) to pass. The connector body 150 has a plurality of first locking slots 151a. The spring 140 is sleeved onto the holder 120. The retainer 130 has a plurality of first locking hooks 132 which are respectively fastened with the first locking slots 151a to assemble the spring 140, the holder 120, and the ferrule 110 into the space formed between the retainer 130 and the connector body 150, where the spring 140 is thereby compressed to make the retainer 130, the holder 120, the spring 140, and the connector body 150 abut against each other along the central axis.

More specifically, the holder 120 includes a barrel 121 and a column 122, the ferrule 110 is riveted into the barrel 121, the column 122 extends from the barrel 121 into the connector body 150 in a direction away from the ferrule 110, and one end of the barrel 121 that is away from the column 122 abuts in the retainer 130, where the column 122 and the barrel 121 are structures that extend on the same central axis and form an outer step T2 due to their differences in the outer diameter. Here, the shape of the outer profile of the barrel 121 and an inner wall 131 of the retainer 130 are polygons that are consistent with and correspond to each other. Preferably, the barrel 121 shown in this embodiment is hexagonal, and correspondingly, the inner wall 131 of the retainer 130 is also hexagonal. With such configuration, by matching the outer and inner profiles of the barrel 121 and the retainer 130, the retainer 130 and the holder 120 assembled together achieve a positioning effect, and may prevent the relative rotation of the two along the central axis. Meanwhile, the barrel 121 in a hexagonal shape also has the effect of being easy to be processed and occupying a small space.

Furthermore, the connector body 150 includes a base 151 and a crimp ring 152. The crimp ring 152 is sleeved onto an outer surface 151b of one end of the base 151, and the outer surface 151b is a rough surface with a grid pattern to help combine the base 151 and the crimp ring 152. The other end of the base 151 that is not covered by the crimp ring 152 has the first locking slots 151a as described above to help buckle with the retainer 130, and the column 122 of the holder 120 penetrates the spring 140 and extends into the base 151. One side of the crimp ring 152 that faces away from the base 151 is butted with the cable 30. The base 151 of this embodiment has through holes with the same central axis but different diameters to form an inner step T1. The spring 140 is sleeved onto the column 122 and abuts between the inner step T1 and the outer step T2 of the aforementioned holder 120.

In addition, the optic fiber connector 100 further includes a protective cover 160. One end of the ferrule 110 that is away from the holder 120 passes through the retainer 130, and the protective cover 160 is detachably sleeved onto where the ferrule 110 protrudes from the retainer 130. The outer surface of the protective cover 160 of this embodiment has a rough surface 161, which may have, for example, a plurality of cut slots for the convenience of the user's access. Also, the protective cover 160 has a tapered profile facing away from the ferrule 110. As shown in FIG. 2, the tapered profile helps the user to pass it through the tube 20 in the assembly direction R1.

Figure 5:
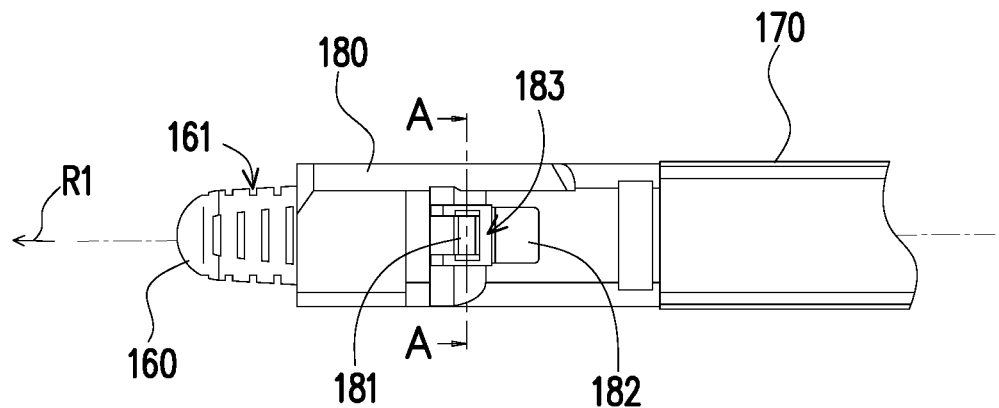
FIG. 5 is a partial side view of the optic fiber connector of FIG. 1.
Figure 6:
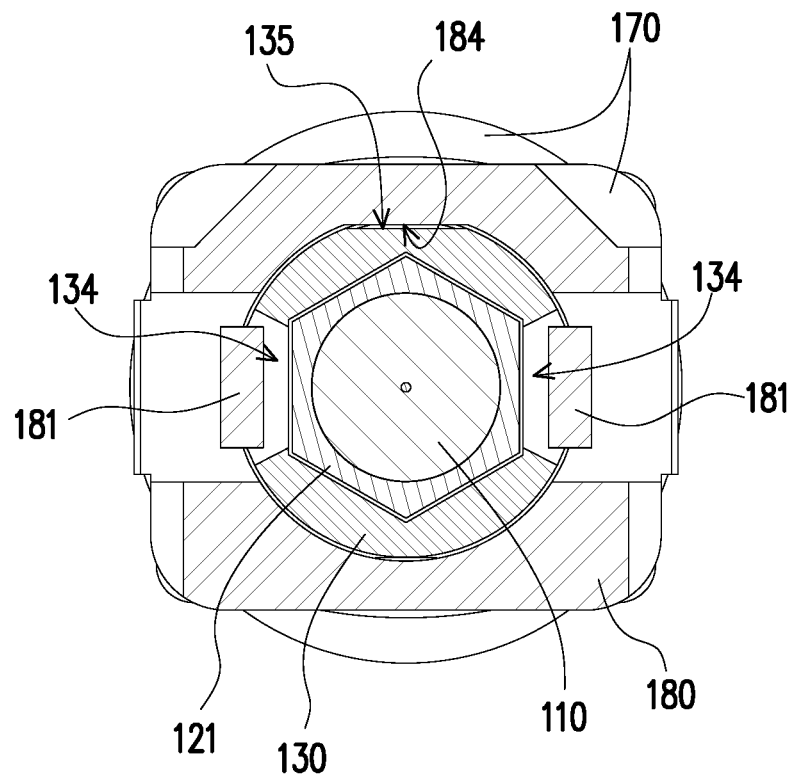
FIG. 6 is a cross-sectional view of the optic fiber connector of FIG. 5 along the AA section line.

FIG. 5 is a partial side view of the optic fiber connector of FIG. 1. FIG. 6 is a cross-sectional view of the optic fiber connector of FIG. 5 along the AA section line. In FIG. 2, FIG. 5, and FIG. 6, in this embodiment, the fixing sleeve 180 of the optic fiber connector 100 is fastened on the outside of the retainer 130 where it is away from the base 151, and the fixing sleeve 180 has a plurality of second locking hooks 181, which are, for example, elastic hooks suspended at an opening 183, to be fastened correspondingly with a plurality of second locking hooks 134 of the retainer 130. Furthermore, the outside of the retainer 130 has a positioning surface 133, which may be, for example, a cut plane formed on the outer cylindrical surface of the cylindrical structure of the retainer 130. Correspondingly, the fixing sleeve 180 has a positioning inner wall 184, which is also flat. When the fixing sleeve 180 is sleeved onto the outside of the retainer 130, the positioning surface 133 abuts against the positioning inner wall 184 correspondingly to secure and avoid relative rotation of the two components along the central axis.

In addition, the tail sleeve 170 of the optic fiber connector 100 is sleeved onto the base 151 of the connector body 150, and covers the crimp ring 152 of the connector body 150 and abuts against the fixing sleeve 180. And after such sleeving, the first locking slots 151a of the base 151 is substantially exposed outside the tail sleeve 170. The coupling cap 190 of the optic fiber connector 100 is sleeved onto the tail sleeve 170 and covers the fixing sleeve 180 described above, where the fixing sleeve 180 has a guiding protrusion 182, the inner wall of the coupling cap 190 has a guiding slot 191, the guiding protrusion 182 is slidably connected to the guiding slot 191, and after such sleeving, the second locking hook 181 of the fixing sleeve 180 is exposed by an opening 192 of the coupling cap 190.

Again in FIG. 2, as mentioned above, the first assembly M1 needs to pass through the tube 20 first, before the tail sleeve 170, the fixing sleeve 180, and the coupling cap 190 are sleeved onto the first assembly M1 in sequence. To facilitate the sleeving process, the tail sleeve 170 of this embodiment has a fixed inner diameter D2, and the inner diameter D2 is larger than the maximum cross-sectional outer diameter D3 of the first assembly M1.

In summary, the optic fiber connector of the present disclosure includes a first assembly including a ferrule, a holder, a connector body, a spring, and a retainer which enable it to pass through the tube for wiring, before sleeving a second assembly on the first assembly that has passed through the tube to complete the assembly of the optic fiber connector. According to the requirements of the inner diameter of the tube, the assembled components are reduced correspondingly in volume, thereby simplifying the processing process. As the volume is reduced, the spring, the retainer, and the ferrule are assembled into the space formed between the retainer and the connector body by buckling the retainer and the connector body, where the spring is compressed by the aforementioned buckling that makes the retainer, the holder, the spring, and the connector body press tightly against each other, so that the first assembly maintain its structural connection and limiting relation properly.

What is claimed is:

1. An optic fiber connector adapted for a tube, comprising:
a ferrule;
a holder, wherein the ferrule is assembled to the holder;
a connector body, having a plurality of first locking slots;
a spring, sleeved onto the holder; and
a retainer, having a plurality of first locking hooks respectively fastened with the first locking slots, so as to assemble the spring, the holder, and the ferrule into a space formed between the retainer and the connector body, wherein the spring is structurally abutted between the holder and the connector body to be compressed to make the retainer, the holder, the spring and the connector body abut against each other.

2. The optic fiber connector according to claim 1, wherein the ferrule is riveted into a barrel of the holder, and the barrel abuts against and within the retainer.

3. The optic fiber connector according to claim 2, wherein a shape of an outer profile of the barrel and an inner wall of the retainer is a polygon that is consistent with and corresponds to each other.

4. The optic fiber connector according to claim 3, wherein the polygon is a hexagon.

5. The optic fiber connector according to claim 1, wherein the connector body comprises a base and a crimp ring, the crimp ring is sleeved onto an outer surface of one end of the base, and other end of the base has the first locking slots.

6. The optic fiber connector according to claim 5, wherein the holder comprises a barrel and a column, the ferrule is disposed in the barrel, the column extends from the barrel to the base in a direction away from the ferrule, and the spring is sleeved onto the column and abuts between an inner step of the base and the barrel.

7. The optic fiber connector according to claim 5, wherein the outer surface is a rough surface.

8. The optic fiber connector according to claim 1, further comprising a protective cover, wherein an end of the ferrule away from the holder passes through the retainer, and the protective cover is detachably sleeved onto where the ferrule protrudes from the retainer.

9. The optic fiber connector according to claim 8, wherein an outer surface of the protective cover has a rough surface.

10. The optic fiber connector according to claim 8, wherein the protective cover has a tapered profile facing away from the ferrule.

11. The optic fiber connector according to claim 1, further comprising a fixing sleeve fastened to an outside of the retainer away from a base.

12. The optic fiber connector according to claim 11, wherein the fixing sleeve has a plurality of second locking hooks fastened with a plurality of second locking slots of the retainer.

13. The optic fiber connector according to claim 11, wherein an outside of the retainer has a positioning surface, the fixing sleeve also has a positioning inner wall, and the positioning surface correspondingly abuts against the positioning inner wall.

14. The optic fiber connector according to claim 11, further comprising a tail sleeve sleeved onto the base of the connector body and covering a crimp ring of the connector body, wherein the base has the first locking slots exposed outside the tail sleeve, and the tail sleeve abuts against the fixing sleeve.

15. The optic fiber connector according to claim 14, further comprising a coupling cap sleeved onto the tail sleeve to cover the fixing sleeve.

16. The optic fiber connector according to claim 15, wherein the fixing sleeve has a guiding protrusion, an inner wall of the coupling cap has a guiding slot, and the guiding protrusion is slidably connected to the guiding slot.

17. The optic fiber connector according to claim 1, wherein an inner diameter of the tube is 5.5 mm, and a maximum cross-sectional outer diameter of the ferrule, the holder, the connector body, the spring, and the retainer after being assembled is less than 5.5 mm.

18. The optic fiber connector according to claim 1, wherein the optic fiber connector is an SC connector.

* * * * *